(12) United States Patent
Eo et al.

(10) Patent No.: US 11,111,967 B2
(45) Date of Patent: Sep. 7, 2021

(54) COMPLEX SYNCHRONIZER

(71) Applicants: Hyundai Motor Company, Seoul (KR); Kia Motors Corporation, Seoul (KR)

(72) Inventors: Soon Ki Eo, Whasung-si (KR); Chon Ok Kim, Whasung-si (KR); Choung Wan Son, Whasung-si (KR); Young Bae Ryu, Whasung-si (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 63 days.

(21) Appl. No.: 16/675,076

(22) Filed: Nov. 5, 2019

(65) Prior Publication Data

US 2021/0018050 A1    Jan. 21, 2021

(30) Foreign Application Priority Data

Jul. 17, 2019  (KR) ........................ 10-2019-0086346

(51) Int. Cl.
*F16D 23/02*    (2006.01)
*F16D 23/06*    (2006.01)
*F16H 3/093*    (2006.01)

(52) U.S. Cl.
CPC .... *F16D 23/025* (2013.01); *F16D 2023/0631* (2013.01); *F16H 2003/0931* (2013.01)

(58) Field of Classification Search
CPC ................... B60K 17/08; F16D 23/025; F16D 2023/0631; F16H 2003/0931
See application file for complete search history.

(56) References Cited

U.S. PATENT DOCUMENTS

| | | | | |
|---|---|---|---|---|
| 4,565,106 | A * | 1/1986 | Sumiyoshi | F16H 3/093 74/329 |
| 9,623,744 | B2 * | 4/2017 | Lee | F16H 3/78 |
| 2017/0343081 | A1 * | 11/2017 | Horiguchi | F16H 3/093 |
| 2019/0293151 | A1 * | 9/2019 | Hayashi | F16H 3/10 |

FOREIGN PATENT DOCUMENTS

KR    10-2007-0103925 A    10/2007

* cited by examiner

*Primary Examiner* — Charles A Fox
*Assistant Examiner* — Lori Wu
(74) *Attorney, Agent, or Firm* — Morgan, Lewis & Bockius LLP

(57) ABSTRACT

A complex synchronizer may include a first connection gear and a second connection gear that are fixed to a shaft; a first external gear having a first sleeve, which can engage with the first connection gear by sliding along the shaft, and rotatably mounted on the shaft; a second external gear having a second sleeve, which can engage with the second connection gear by sliding along the shaft, and rotatably mounted on the shaft; and an intermediate gear being able to connect or disconnect the first sleeve and the second sleeve, depending on axial sliding states of the first sleeve and the second sleeve.

9 Claims, 16 Drawing Sheets

FIG. 16

| ITEM | CLUTCH | | 2&5S | | | 4S | | COMPLEX SYNCHRONIZER | | | | |
| --- | --- | --- | --- | --- | --- | --- | --- | --- | --- | --- | --- | --- |
| | | | | | | | | FIRST SLEEVE | | | SECOND SLEEVE | |
| | CL1 | CL2 | 2P | NEUTRAL | 5P | N | 4P | FIRST EXTERNAL GEAR | INTER-MEDIATE GEAR | INTER-MEDIATE GEAR | NEUTRAL | SECOND EXTERNAL GEAR |
| FIRST STAGE | ● | × | ● | × | × | ● | × | × | ● | ● | × | × |
| SECOND STAGE | × | ● | ● | × | × | ● | × | × | ● | × | ● | × |
| THIRD STAGE | ● | × | × | ● | × | ● | × | × | ● | × | × | ● |
| FOURTH STAGE | × | ● | × | ● | × | × | ● | × | ● | × | ● | × |
| FIFTH STAGE | ● | × | × | × | ● | ● | × | × | ● | × | ● | × |
| SIXTH STAGE | × | ● | × | ● | × | × | × | ● | × | × | ● | × |

COMPLEX SYNCHRONIZER

CROSS-REFERENCE TO RELATED APPLICATION

The present application claims priority to Korean Patent Application No. 10-2019-0086346, filed on Jul. 17, 2019 in the Korean Intellectual Property Office, the entire contents of which is incorporated herein for all purposes by this reference.

BACKGROUND OF THE INVENTION

Field of the Invention

The present invention relates to the configuration of a synchronizer that can be used for a synchromesh type shifting mechanism.

Description of Related Art

A synchromesh type shifting mechanism which is used in a Manual Transmission (MT), an Automatic Manual Transmission (AMT), a Dual Clutch Transmission (DCT), etc. In the related art performs shifting in the manner of synchronizing a shaft and a speed gear through a synchronizer and then engaging gears.

That is, synchronizers of the related art implement shifting stages by synchronizing the rotation speed of a shaft to which a speed gear is freely rotatably supported and the rotation speed of the speed gear, and then coupling a sleeve rotating with the shaft to a clutch gear integrally connected to the speed gear such that torque is consequently transmitted between the shaft and the speed gear.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a complex synchronizer that synchronously engages or disengages a shaft and a speed gear mounted on the shaft and is engaged with an adjacent speed gear to be configured to transmit power to each other such that a transmission may be made more compact when the complex synchronizer is used in the transmission, being able to reduce the entire length, volume, etc. of the transmission.

In view of the foregoing, a complex synchronizer according to an exemplary embodiment of the present invention includes: a first connection gear and a second connection gear that are fixed to a shaft; a first external gear having a first sleeve, which can engage with the first connection gear by sliding along the shaft, and rotatably mounted on the shaft; a second external gear having a second sleeve, which can engage with the second connection gear by sliding along the shaft, and rotatably mounted on the shaft; and an intermediate gear being able to connect or disconnect the first sleeve and the second sleeve, depending on axial sliding states of the first sleeve and the second sleeve.

The intermediate gear may be mounted between the first connection gear and the second connection gear to be rotatable with respect to the shaft.

The intermediate gear, the first connection gear, and the second connection gear may have the same outer diameter; the first sleeve may be mounted to be able to connect or disconnect the intermediate gear and the first connection gear by axially sliding in a state in which it is engaged with the intermediate gear; and the second sleeve may be mounted to be able to change to a state in which it is engaged with the intermediate gear, a state in which it is engaged with the second connection gear, and a neutral state in which it is not engaged with either the intermediate gear or the second connection gear, by axially sliding on the shaft.

The complex synchronizer may further include: a first synchro-ring mounted to synchronize the first connection gear and the intermediate gear when the first sleeve slides toward the first connection gear; a second synchro-ring mounted to synchronize the second external gear and the intermediate gear when the second sleeve slides toward the intermediate gear; and a third synchro-ring mounted to synchronize the second connection gear and the second external gear when the second sleeve slides toward the second connection gear.

The intermediate gear may be integrally formed with the first sleeve at a side of the first sleeve, the side of the first sleeve facing the second sleeve.

The complex synchronizer may further include: a first synchro-ring mounted to synchronize the first connection gear and the first external gear when the first sleeve slides toward the first connection gear; a second synchro-ring mounted to synchronize the second external gear and the intermediate gear when the second sleeve slides toward the intermediate gear; and a third synchro-ring mounted to synchronize the second connection gear and the second external gear when the second sleeve slides toward the second connection gear.

In view of another aspect, a transmission using the complex synchronizer according to various exemplary embodiments of the present invention includes: a first input shaft mounted to receive power which is input through a first clutch; a second input shaft mounted coaxially with the first input shaft to receive power which is input through a second clutch; a first output shaft mounted in parallel with the first input shaft and having a first output gear; a second output shaft mounted in parallel with the first input shaft and having a second output gear; a complex synchronizer mounted on the second output shaft such that the shaft of the complex synchronizer becomes the second output shaft; a sixth-stage driving gear mounted on the second input shaft to implement a sixth stage which is the highest shifting stage having the smallest gear ratio of a series of shifting stages, which are implemented by the transmission, by engaging with the first external gear of the complex synchronizer; and a third-stage driving gear mounted on the first input shaft to implement a third stage of the series of shifting stages by engaging with the second external gear of the complex synchronizer.

A second-stage driving gear for implementing a second stage of the series of shifting stages may be mounted on the second input shaft; a second-stage driven gear implementing the second stage by engaging with the second-stage driving gear may be mounted on the first output shaft; and a power transmission path including the second external gear, the first external gear, the sixth-stage driving gear, the second-stage driving gear, and the second-stage driven gear from the third-stage driving gear may implement a first stage having the largest gear ratio of the series of shifting stages, with the first sleeve and the second sleeve of the complex synchronizer connected.

A fourth-stage driving gear implementing a fourth stage of the series of shifting stages may be mounted on the second input shaft; a fourth-stage driven gear implementing the fourth stage by engaging with the fourth-stage driving gear may be mounted on the second output shaft; a fifth-stage driving gear implementing a fifth stage of the series of shifting stages may be mounted on the first input shaft; and a fifth-stage driven gear implementing the fifth stage by engaging with the fifth-stage driven gear may be mounted on the first output shaft.

The present invention synchronously engages or disengages a shaft and a speed gear mounted on the shaft and is engaged with an adjacent speed gear to be able to transmit power to each other such that a transmission may be made more compact when the complex synchronizer is used in the transmission, being able to reduce the entire length, volume, etc. of the transmission.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other aspects, features and advantages present invention

FIG. 16 is a table showing the operation states of a clutch and a synchronizer when the transmission of FIG. 9 implements the first state to the sixth stage.

Figure 1:
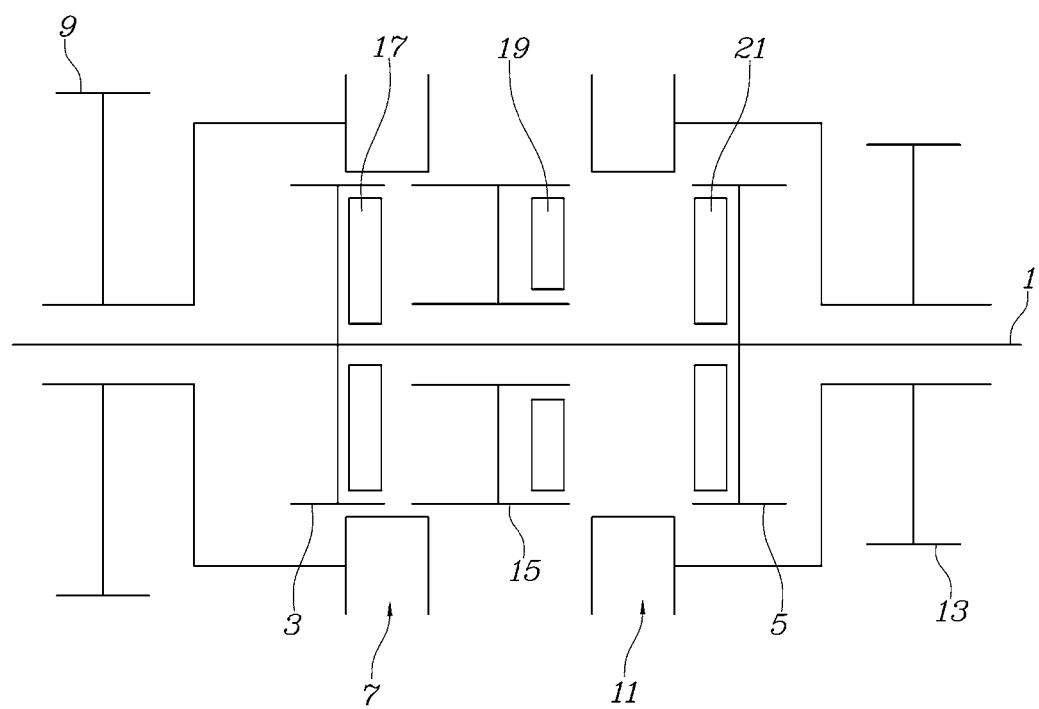
FIG. 1 is a diagram showing the configuration of various exemplary embodiments of a complex synchronizer according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Referring to FIG. 1, FIG. 2, FIG. 3, and FIG. 4, various exemplary embodiments of a complex synchronizer of the present invention includes: a first connection gear 3 and a second connection gear 5 that are fixed to a shaft 1; a first external gear 9 having a first sleeve 7, which can engage with the first connection gear 3 by sliding along the shaft, and rotatably mounted on the shaft 1; a second external gear 13 having a second sleeve 11, which can engage with the second connection gear 5 by sliding along the shaft, and rotatably mounted on the shaft 1; and an intermediate gear 15 being able to connect or disconnect the first sleeve 7 and the second sleeve 11, depending on axial sliding states of the first sleeve 7 and the second sleeve 11.

Figure 2:
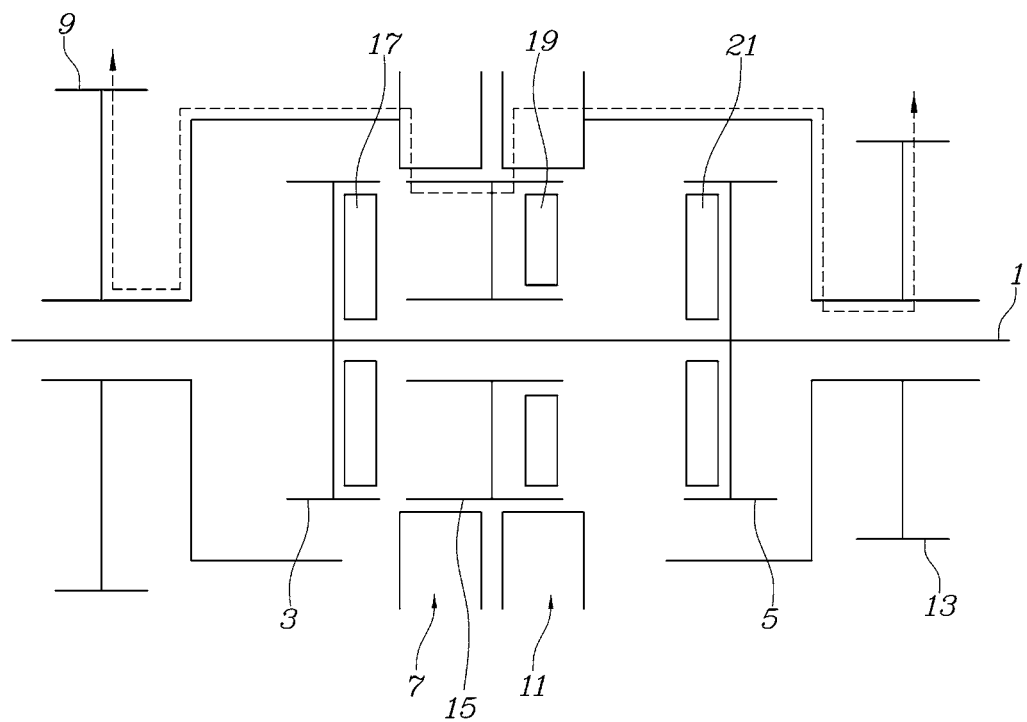
FIG. 2, FIG. 3 and FIG. 4 are diagrams illustrating the operation state and the power flow of the various exemplary embodiments.
Figure 3:
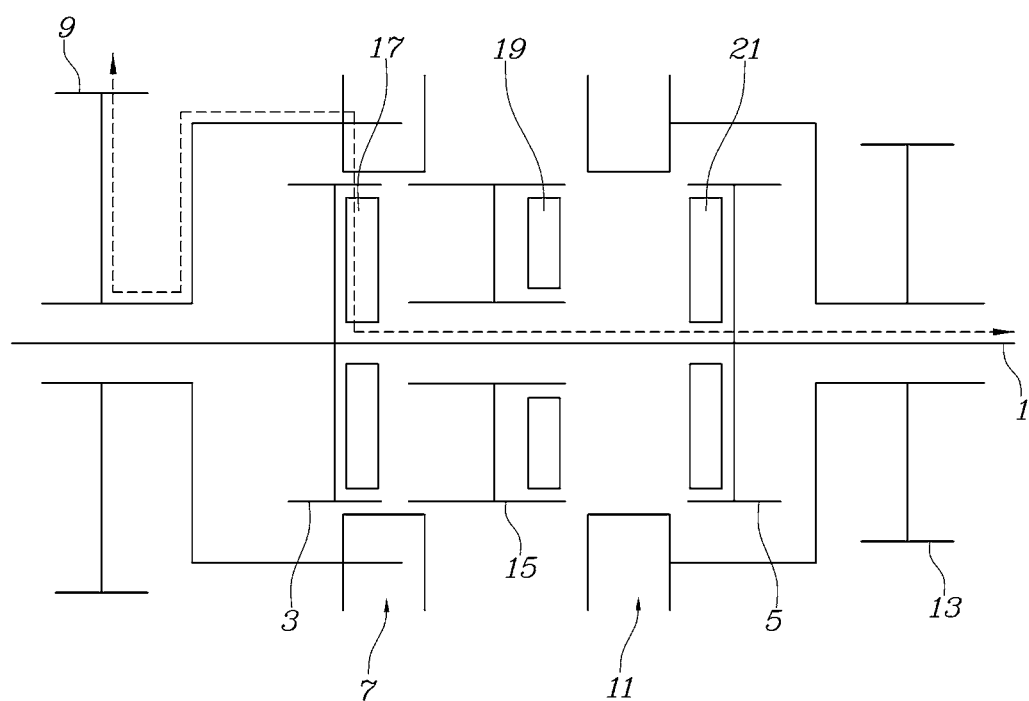
Figure 4:
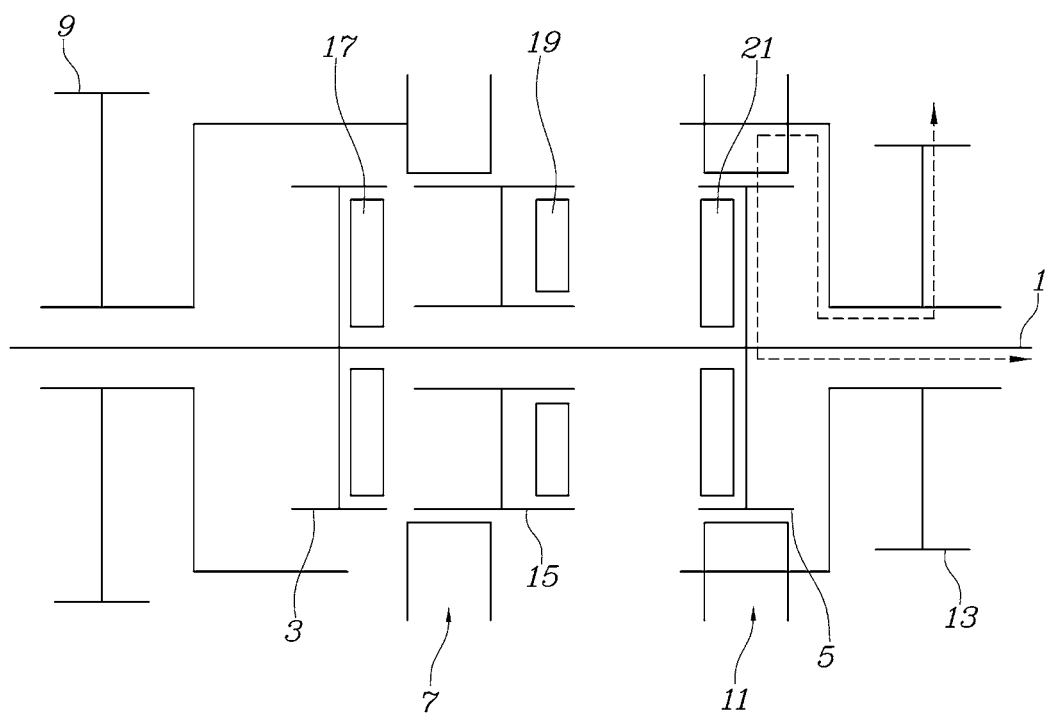
Figure 5:
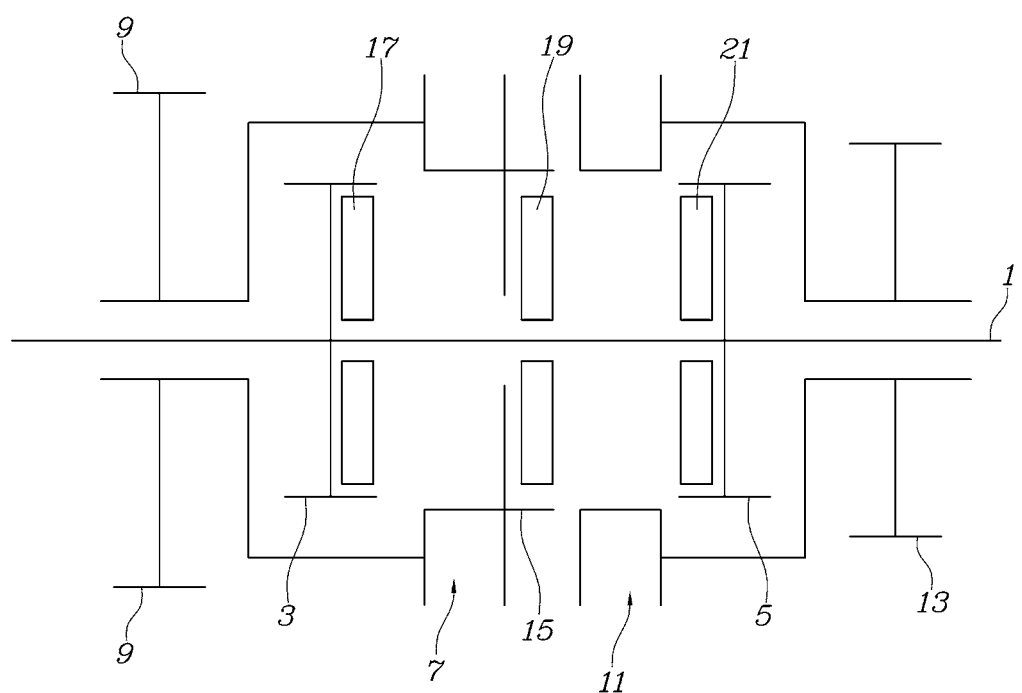
FIG. 5 is a diagram showing the configuration of various exemplary embodiments of a complex synchronizer according to an exemplary embodiment of the present invention.

That is, the complex synchronizer, depending on axial positions of the first sleeve 7 and the second sleeve 11, can implement a state shown in FIG. 2 in which it connects the first external gear 9 and the second external gear 13 such that power may be transmitted, a state shown in FIG. 3 in which it connects the first external gear 9 and the shaft 1 such that power may be transmitted, an a state shown in FIG. 4 in which it connects second external gear 13 and the shaft 1 such that power may be transmitted.

Figure 9:
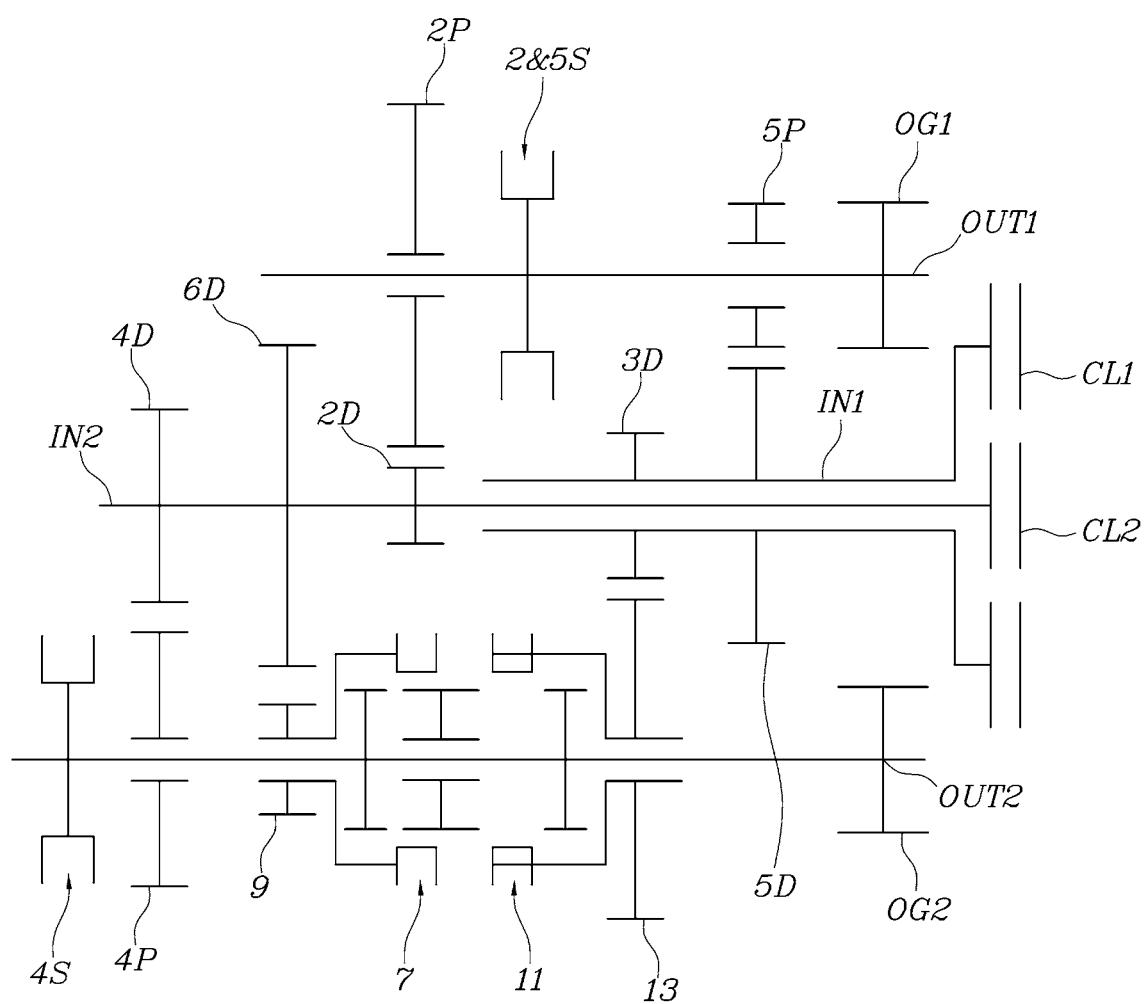
FIG. 9 is a diagram showing the configuration of a transmission that utilizes the various exemplary embodiments according to an exemplary embodiment of the present invention.
Figure 10:
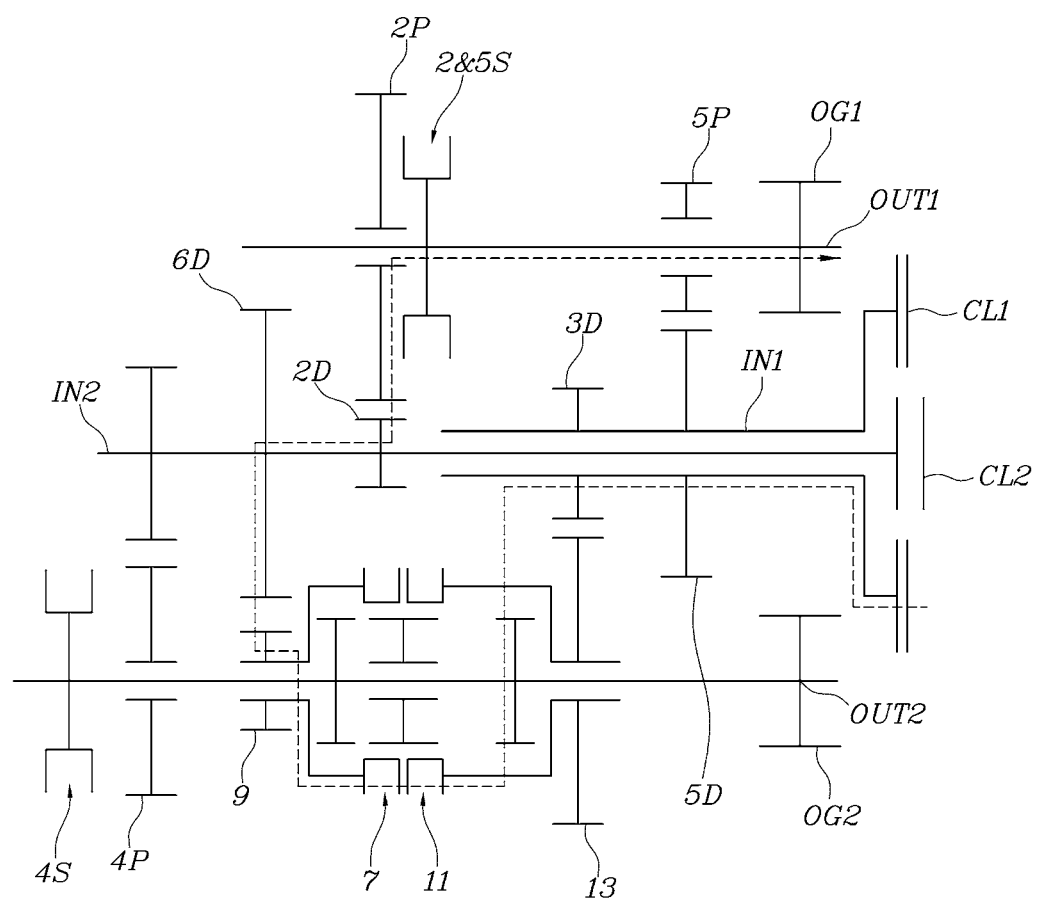
FIG. 10, FIG. 11, FIG. 12, FIG. 13, FIG. 14 and FIG. 15 are diagrams illustrating the state when the transmission of FIG. 9 implements a first stage to a sixth stage.
Figure 11:
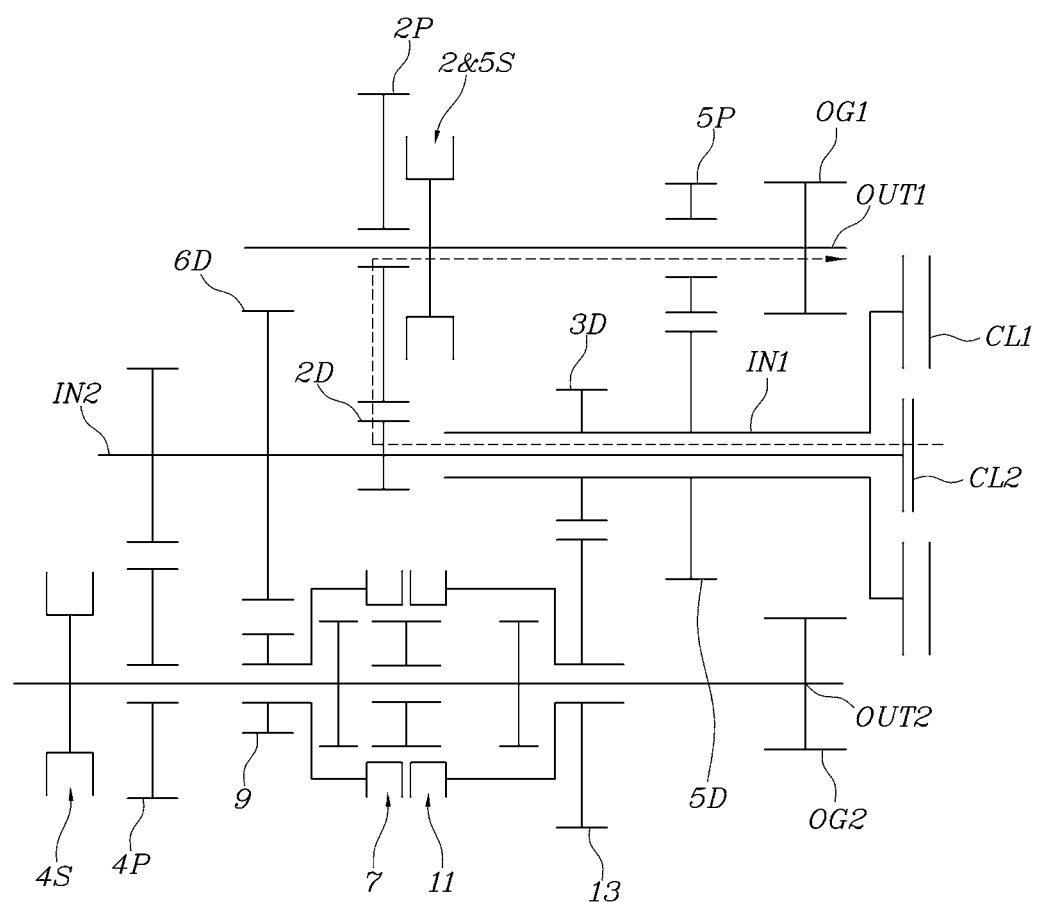
Figure 12:
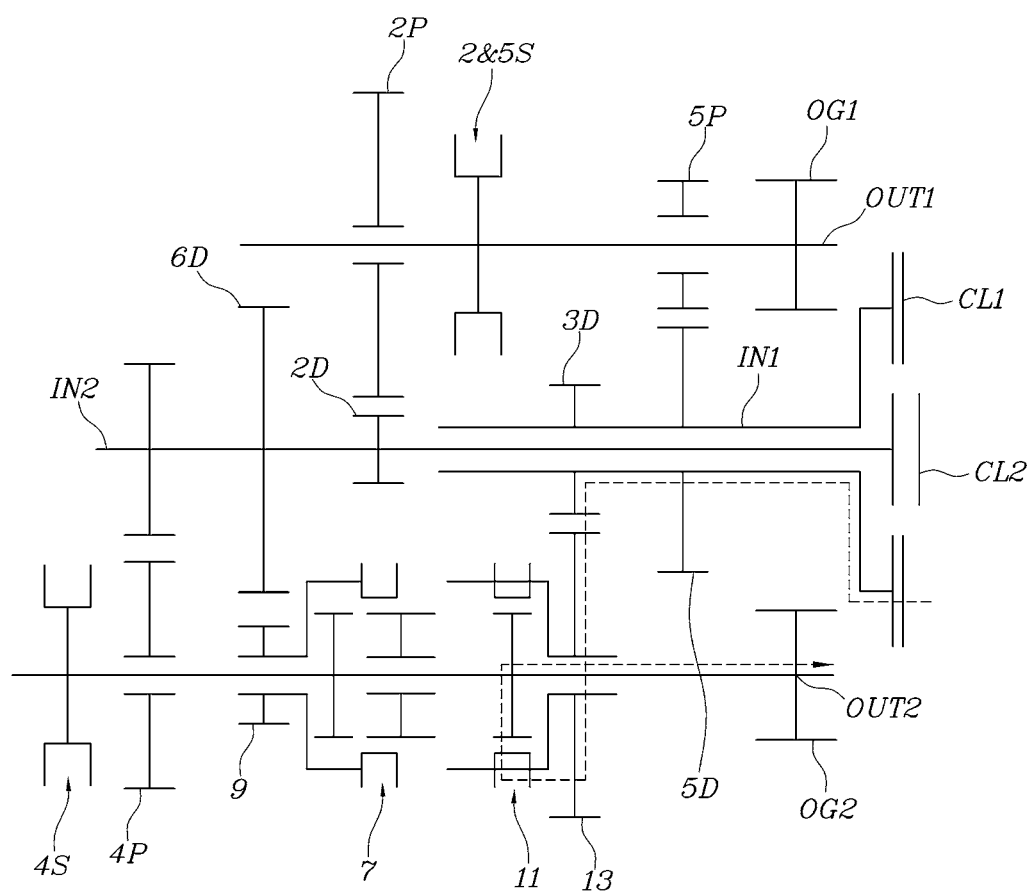
Figure 13:
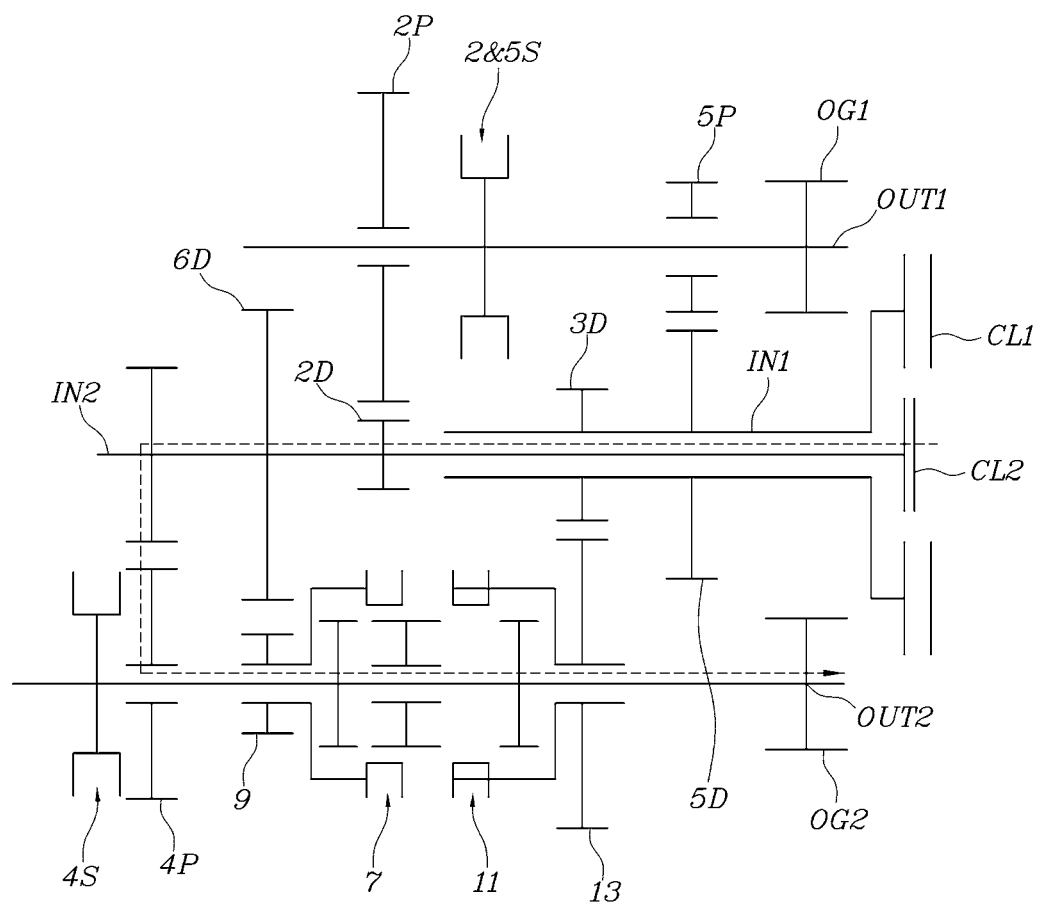
Figure 14:
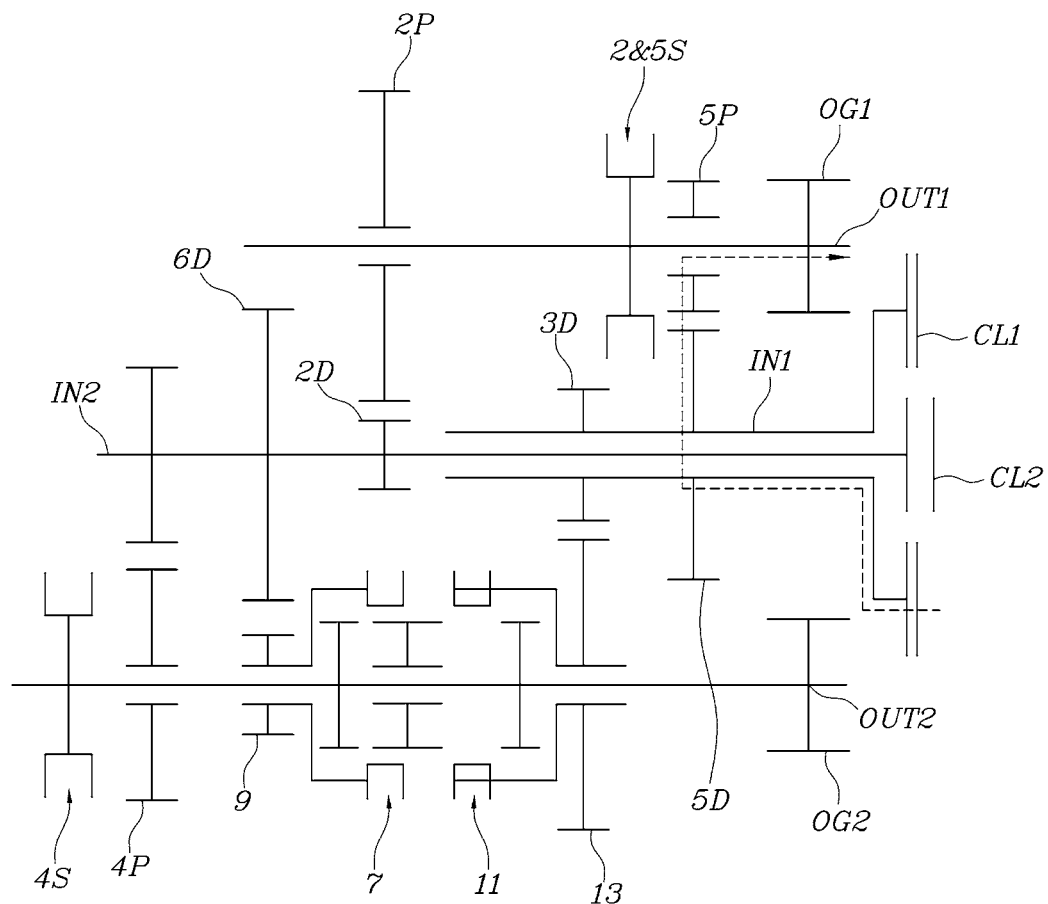
Figure 15:
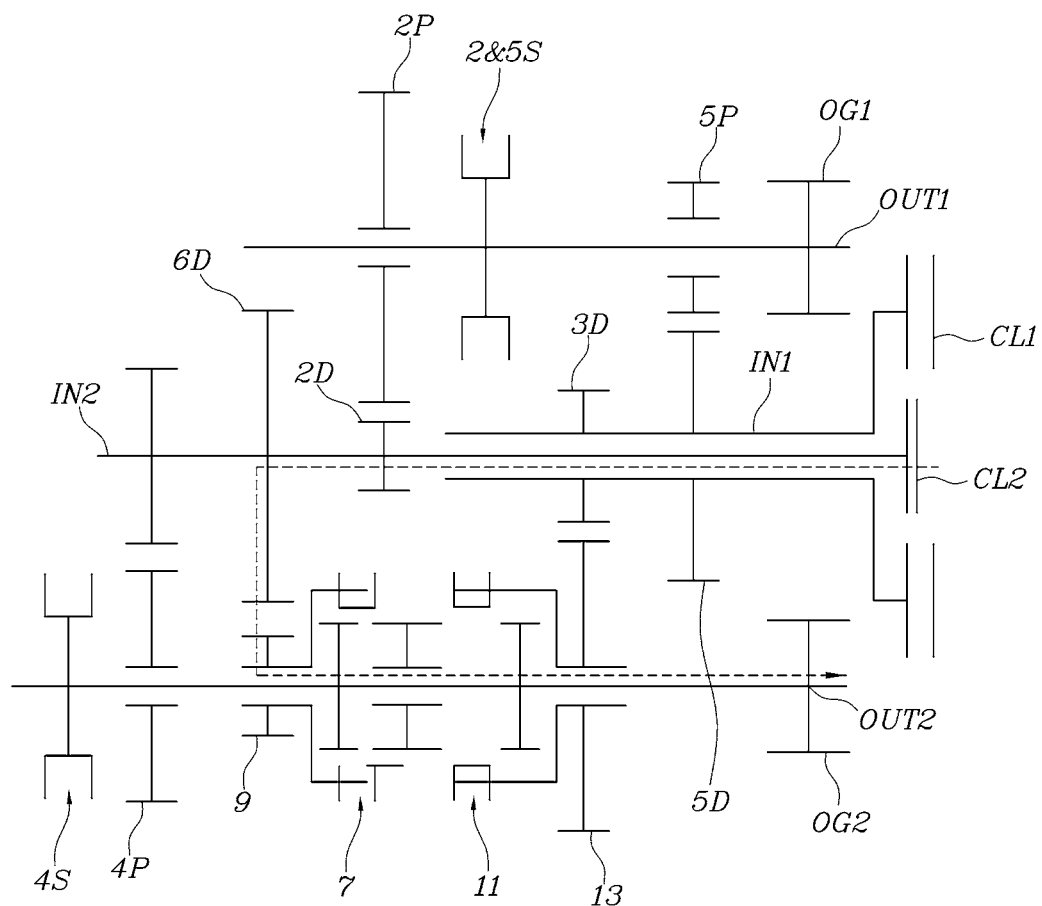

The first external gear 9 and the second external gear 13, respectively, can engage with another gear and transmit/receive power, so they may be used to implement different shifting stages, respectively, in a transmission. For example, as shown in FIG. 9, the first external gear 9 may implement a sixth stage and the second external gear 13 may implement a third stage.

The intermediate gear 15 is mounted between the first connection gear 3 and the second connection gear 5 to be rotatable with respect to the shaft 1.

In the various exemplary embodiments of FIG. 1, FIG. 2, FIG. 3, and FIG. 4, the intermediate gear 15, the first connection gear 3, and the second connection gear 5 have the same external diameter; the first sleeve 7 is mounted to be able to connect or disconnect the intermediate gear 15 and the first connection gear 3 by axially sliding in a state in which it is engaged with the intermediate gear 15; and the second sleeve 11 is mounted to be able to change to a state in which it is engaged with the intermediate gear 15, a state in which it is engaged with the second connection gear 5, and a neutral state in which it is not engaged with either the intermediate gear 15 or the second connection gear 5, by axially sliding on the shaft.

For reference, the term 'axial' means the longitudinal direction of the shaft 1 and, the sleeves, as they are commonly used synchromesh type transmissions, are configured such that the engagement stage with adjacent gears may be changed when they are axially slid straight by a shift fork.

The complex synchronizer of FIG. 1 includes: a first synchro-ring 17 mounted to synchronize the first connection gear 3 and the intermediate gear 15 when the first sleeve 7 slides toward the first connection gear 3; a second synchro-ring 19 mounted to synchronize the second external gear 13 and the intermediate gear 15 when the second sleeve 11 slides toward the intermediate gear 15; and a third synchro-ring 21 mounted to synchronize the second connection gear 5 and the second external gear 13 when the second sleeve 11 slides toward the second connection gear 5.

The synchro-rings, similar to the synchronizers that are used in synchromesh type transmissions of the related art, are configured to be axially pressed and generate friction by axial movement of the sleeves, synchronizing two gears that are intended to be engaged by the sleeves.

In the exemplary embodiment of the present invention, the second synchro-ring 19 and the third synchro-ring 21 are mounted between the second connection gear 5 and the intermediate gear 15, but, between the first connection gear 3 and the intermediate gear 15, only the first synchro-ring 17 is mounted at a side of the first connection gear 3 without a specific synchro-ring at a side of the intermediate gear 15. This is because the first sleeve 7 keeps engaged with the intermediate gear 15 without completely separating from the intermediate gear 15.

The present configuration contributes not only to reducing the length of the complex synchronizer by decreasing the number of required synchro-rings, but also to reducing the length of a transmission using the complex synchronizer.

FIGS. 5 to 8 show various exemplary embodiments of the complex synchronizer of the present invention, in which other configurations are the same as those of the various exemplary embodiments in FIGS. 1-4 except that the intermediate gear 15 is integrally formed with the first sleeve 7 at the side, which faces the second sleeve 11, of the first sleeve 7.

That is, the intermediate gear 15 is integrally formed with the first sleeve 7 in a state in which it can engage with the second sleeve 11.

The present exemplary embodiment includes: a first synchro-ring 17 mounted to synchronize the first connection gear 3 and the first external gear 9 when the first sleeve 7 slides toward the first connection gear 3; a second synchro-ring 19 mounted to synchronize the second external gear 13 and the intermediate gear 15 when the second sleeve 11 slides toward the intermediate gear 15; and a third synchro-ring 21 mounted to synchronize the second connection gear 5 and the second external gear 13 when the second sleeve 11 slides toward the second connection gear 5.

Figure 6:
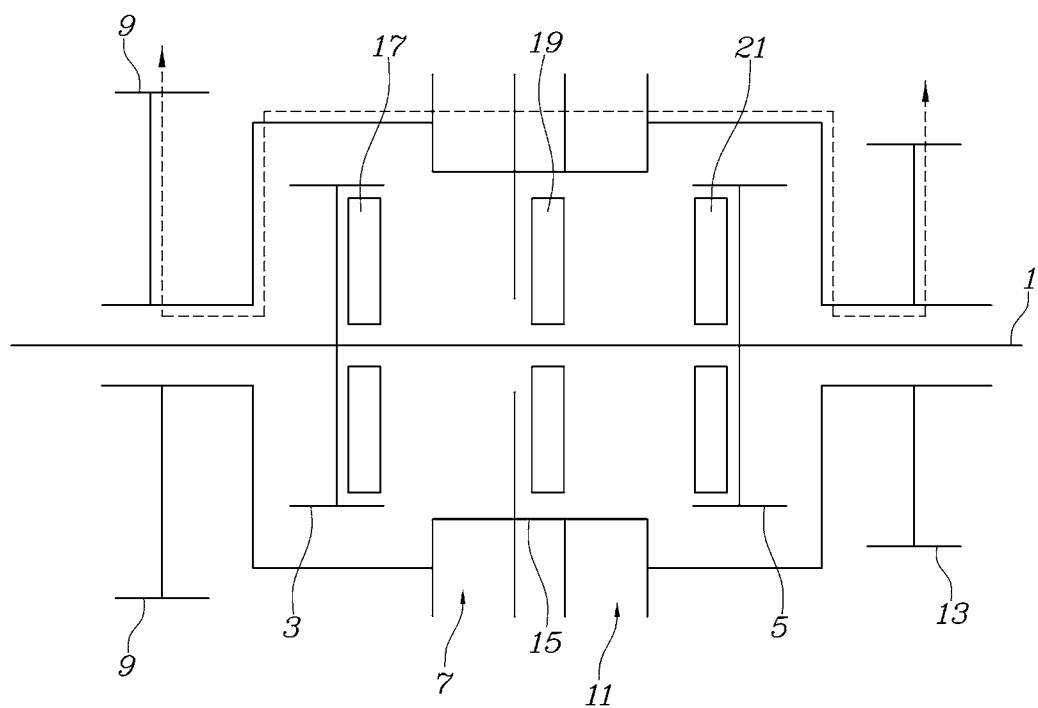
FIG. 6, FIG. 7, and FIG. 8 are diagrams illustrating the operation state and the power flow of the various exemplary embodiments.
Figure 7:
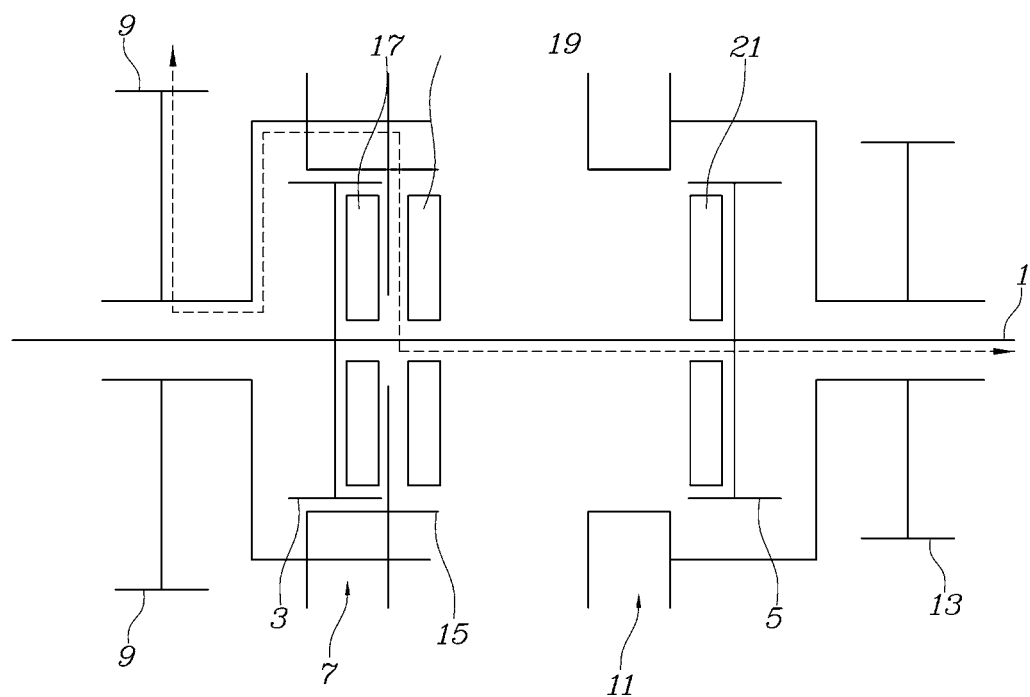
Figure 8:
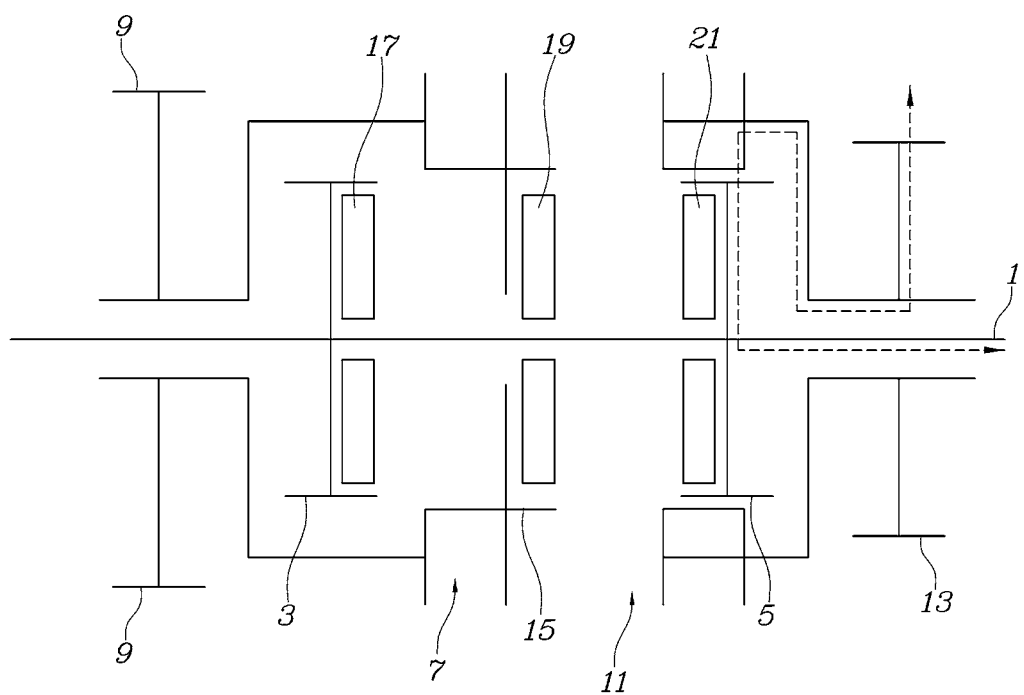

Accordingly, the complex synchronizer of the exemplary embodiment of the present invention, as the second sleeve 11 moves toward the first sleeve 7 and engages with the intermediate gear 15, can implement a state in which the first external gear 9 and the second external gear 13 are connected to be configured to transmit power through the first sleeve 7 and the second sleeve 11, as shown in FIG. 6, a state in which the first sleeve 7 is engaged with the first connection gear 3, as shown in FIG. 7, and a state in which the second sleeve 11 is engaged with the second connection gear 5, as shown in FIG. 8.

FIG. 9 shows an example of a transmission which may be implemented by use of the complex synchronizers described above, in which, in detail, the complex synchronizer of the various exemplary embodiments is used, but it may be replaced with the complex synchronizer of the various exemplary embodiments.

The transmission of FIG. 9 includes: a first input shaft IN1 mounted to receive power which is input through a first clutch CL1; a second input shaft IN2 mounted coaxially with the first input shaft IN1 to receive power which is input through a second clutch CL2; a first output shaft OUT1 mounted in parallel with the first input shaft IN1 and having a first output gear OG1; a second output shaft OUT2 mounted in parallel with the first input shaft IN1 and having a second output gear OG2; a complex synchronizer mounted on the second output shaft OUT2 such that the shaft 1 of the complex synchronizer becomes the second output shaft OUT2; a sixth-stage driving gear 6D mounted on the second input shaft IN2 to implement a sixth stage which is the highest shifting stage having the smallest gear ratio of a series of shifting stages, which are implemented by the transmission, by engaging with the first external gear 9 of the complex synchronizer; and a third-stage driving gear 3D mounted on the first input shaft IN1 to implement a third stage of the series of shifting stages by engaging with the second external gear 13 of the complex synchronizer.

That is, the transmission is a dual-clutch transmission (DCT) having six forward stages using the complex synchronizer having the configuration shown in FIG. 1.

A second-stage driving gear 2D for implementing a second stage of the series of shifting stages is mounted on the second input shaft IN2; a second-stage driven gear 2P implementing the second stage by engaging with the second-stage driving gear 2D is mounted on the first output shaft OUT1; and a power transmission path including the second external gear 13, the first external gear 9, the sixth-stage driving gear 6D, the second-stage driving gear 2D, and the second-stage driven gear 2P from the third-stage driving gear 3D implements a first stage having the largest gear ratio of the series of shifting stages, with the first sleeve 7 and the second sleeve 11 of the complex synchronizer connected.

That is, in the transmission of the present invention, a first-stage gear ratio is not implemented simply through a pair of external gears, but implemented by combining gears for implementing the second stage, the third stage, and the sixth stage, so there is no demand for specific gears for implementing the first stage and accordingly it is possible to reduce the distance between shafts that are used in transmissions. Therefore, it is possible to reduce the number of portions in transmissions and it is also possible to decrease the length and weight of transmissions.

A fourth-stage driving gear 4D implementing a fourth stage of the series of shifting stages is mounted on the second input shaft IN2; a fourth-stage driven gear 4P implementing the fourth stage by engaging with the fourth-stage driving gear 4D is mounted on the second output shaft OUT2; a fifth-stage driving gear 5D implementing a fifth stage of the series of shifting stages is mounted on the first input shaft IN1; and a fifth-stage driven gear 5P implementing the fifth stage by engaging with the fifth-stage driven gear 5D is mounted on the first output shaft OUT1, configuring a dual-clutch transmission (DCT) that can implement a total of six shifting stages.

For reference, a 2&5-stage synchronize 2&5S that can connect or disconnect the second-stage driven gear 2P and the fifth-stage driven gear 5P is mounted on the first output shaft OUT1, and a fourth-stage synchronizer 4S that can connect or disconnect the fourth-stage driven gear 4P to or from the second output shaft OUT2 is mounted on the second output shaft OUT2.

FIGS. 10 to 15 show a state in which the transmission described above implements the first to sixth stages. As for the first stage, as described above, the first sleeve 7 and the second sleeve 11 are connected, so power supplied to the first input shaft IN1 through the first clutch CL1 is output with a first-stage gear ratio to the first output shaft OUT1 through the third-stage driving gear 3D, the second external gear 13, the second sleeve 11, the first sleeve 7, the first external gear 9, the sixth-stage driving gear 6D, the second-stage driving gear 2D, and the second-stage driven gear 2P.

Obviously, the first output gear OG1 on the first output shaft OUT1 and the second output gear OG2 on the second output shaft OUT2 are connected through a common differential such that power which is output to the first output shaft OUT1 and the second output shaft OUT2 may be transmitted to driving wheels of a vehicle through the differential.

Furthermore, the others, the second stage to the sixth stages are implemented in the same way as common synchromesh type transmission of the related art, it is not described herein.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A complex synchronizer comprising:
   a first connection gear and a second connection gear that are fixed to a shaft;
   a first gear integrally formed with a first sleeve, which is rotatably mounted on the shaft and selectively engages with the first connection gear by sliding along the shaft;
   a second gear integrally formed with a second sleeve, which is rotatably mounted on the shaft and selectively engages with the second connection gear by sliding along the shaft; and
   an intermediate gear being configured to selectively connect the first sleeve and the second sleeve, depending on axial sliding states of the first sleeve and the second sleeve.

2. The complex synchronizer of claim 1,
   wherein the intermediate gear is mounted between the first connection gear and the second connection gear to be rotatable with respect to the shaft.

3. The complex synchronizer of claim 2,
   wherein the intermediate gear, the first connection gear, and the second connection gear have a same external diameter;
   wherein the first sleeve is disposed to selectively connect the intermediate gear and the first connection gear by axially sliding in a state in which the first sleeve is engaged with the intermediate gear; and
   wherein the second sleeve is disposed to change to a first state in which the second sleeve is engaged with the intermediate gear, a second state in which the second sleeve is engaged with the second connection gear, and a third state in which the second sleeve is not engaged with either the intermediate gear or the second connection gear, by axially sliding on the shaft.

4. The complex synchronizer of claim 3, further including:
   a first synchro-ring disposed to synchronize the first connection gear and the intermediate gear when the first sleeve slides toward the first connection gear;
   a second synchro-ring disposed to synchronize the second gear and the intermediate gear when the second sleeve slides toward the intermediate gear; and
   a third synchro-ring disposed to synchronize the second connection gear and the second gear when the second sleeve slides toward the second connection gear.

5. The complex synchronizer of claim 2,
   wherein the intermediate gear is integrally formed with the first sleeve at a side of the first sleeve, the side of the first sleeve facing the second sleeve.

6. The complex synchronizer of claim 5, further including:
   a first synchro-ring disposed to synchronize the first connection gear and the first gear when the first sleeve slides toward the first connection gear;
   a second synchro-ring disposed to synchronize the second gear and the intermediate gear when the second sleeve slides toward the intermediate gear; and
   a third synchro-ring disposed to synchronize the second connection gear and the second gear when the second sleeve slides toward the second connection gear.

7. A transmission using the complex synchronizer of claim 1, the transmission comprising:
   a first input shaft mounted to receive power which is input through a first clutch;
   a second input shaft mounted coaxially with the first input shaft to receive power which is input through a second clutch;
   a first output shaft mounted in parallel with the first input shaft and having a first output gear;
   a second output shaft mounted in parallel with the first input shaft and having a second output gear;
   the complex synchronizer mounted on the second output shaft such that the shaft of the complex synchronizer becomes the second output shaft;
   a sixth-stage driving gear fixed on the second input shaft to implement a sixth stage which is a highest shifting stage having a smallest gear ratio of a series of shifting stages, which are implemented by the transmission, by engaging with the first gear of the complex synchronizer; and
   a third-stage driving gear fixed on the first input shaft to implement a third stage of the series of the shifting stages by engaging with the second gear of the complex synchronizer.

8. The transmission of claim 7,
   wherein a second-stage driving gear for implementing a second stage of the series of the shifting stages is fixed on the second input shaft;
   wherein a second-stage driven gear implementing the second stage by engaging with the second-stage driving gear is rotatably mounted on the first output shaft; and
   wherein a power transmission path including the second gear, the first gear, the sixth-stage driving gear, the second-stage driving gear, and the second-stage driven gear from the third-stage driving gear implements a first stage having a largest gear ratio of the series of the shifting stages, with the first sleeve and the second sleeve of the complex synchronizer connected.

9. The transmission of claim 8,
wherein a fourth-stage driving gear implementing a fourth stage of the series of the shifting stages is fixed on the second input shaft;
wherein a fourth-stage driven gear implementing the fourth stage by engaging with the fourth-stage driving gear is rotatably mounted on the second output shaft;
wherein a fifth-stage driving gear implementing a fifth stage of the series of the shifting stages is fixed on the first input shaft; and
wherein a fifth-stage driven gear implementing the fifth stage by engaging with the fifth-stage driving gear is rotatably mounted on the first output shaft.

* * * * *